United States Patent
Guillois et al.

(10) Patent No.: US 11,939,933 B2
(45) Date of Patent: Mar. 26, 2024

(54) MOBILE-COWL THRUST REVERSER COMPRISING A THRUST-REDUCTION MECHANISM THAT IS INDEPENDENT OF THE MOBILE COWL

(71) Applicants: SAFRAN NACELLES, Gonfreville-l'Orcher (FR); SAFRAN AIRCRAFT ENGINES, Paris (FR)

(72) Inventors: Denis Guillois, Moissy-Cramayel (FR); Florent Matthieu Jacques Nobelen, Moissy-Cramayel (FR); Luigi Bisanti, Moissy-Cramayel (FR)

(73) Assignees: SAFRAN NACELLES, Gonfreville-L'Orcher (FR); SAFRAN AIRCRAFT ENGINES, Paris (FR)

( * ) Notice: Subject to any disclaimer, the term of this patent is extended or adjusted under 35 U.S.C. 154(b) by 11 days.

(21) Appl. No.: 17/596,525

(22) PCT Filed: Jun. 9, 2020

(86) PCT No.: PCT/FR2020/050976
§ 371 (c)(1),
(2) Date: Dec. 13, 2021

(87) PCT Pub. No.: WO2020/249896
PCT Pub. Date: Dec. 17, 2020

(65) Prior Publication Data
US 2022/0260038 A1      Aug. 18, 2022

(30) Foreign Application Priority Data

Jun. 14, 2019   (FR) ...................................... 1906381

(51) Int. Cl.
*F02K 1/72*       (2006.01)
*F02K 1/76*       (2006.01)

(52) U.S. Cl.
CPC ................ *F02K 1/72* (2013.01); *F02K 1/763* (2013.01)

(58) Field of Classification Search
CPC ..... F02K 1/62; F02K 1/70; F02K 1/72; F02K 1/763
See application file for complete search history.

(56) References Cited

U.S. PATENT DOCUMENTS 3,614,037 A * 10/1971 Vdolek ...................... F02K 1/62
                                                        244/110 B
3,620,022 A * 11/1971 Beale ......................... F02K 1/70
                                                        60/229

(Continued)

FOREIGN PATENT DOCUMENTS

FR        2907512 A1     4/2008
FR        2995876 A1     3/2014

(Continued)

OTHER PUBLICATIONS

Search Report issued in French Patent Application No. 1906381 dated Feb. 28, 2020.

(Continued)

*Primary Examiner* — Ted Kim
(74) *Attorney, Agent, or Firm* — Pearne & Gordon LLP (57) ABSTRACT

In a thrust reverser for an aircraft propulsion unit, the thrust reverser includes an internal fixed structure, a mobile cowl and blocking flaps. The thrust reverser also includes a first actuation mechanism that is configured to move the mobile cowl between a closing position and an opening position so as to cause the blocking flaps to move respectively between a retracted position and a deployed position, thus causing the thrust reverser to pass respectively between a full-thrust configuration and a thrust-reversal configuration. The thrust reverser also includes a second actuation mechanism that is configured to move the blocking flaps between the retracted (Continued)

position and a partially deployed position when the mobile cowl is in the closing position, so as to cause the thrust reverser to pass respectively between the full-thrust configuration and a reduced-thrust configuration.

7 Claims, 5 Drawing Sheets (56) References Cited

U.S. PATENT DOCUMENTS

| | | | | |
|---|---|---|---|---|
| 3,779,010 | A | * | 12/1973 | Chamay .................. F02K 1/72 60/263 |
| 5,782,431 | A | * | 7/1998 | Gal-Or ..................... F02K 1/68 244/110 B |
| 10,119,495 | B1 | | 11/2018 | Nestico et al. |
| 2010/0139242 | A1 | * | 6/2010 | Vauchel ................... F02K 1/72 60/226.2 |
| 2014/0027537 | A1 | | 1/2014 | Binks et al. |
| 2016/0003190 | A1 | * | 1/2016 | Weiner ..................... F02C 7/14 239/265.33 |

FOREIGN PATENT DOCUMENTS

GB 1421153 A 1/1976
WO 2011131874 A1 10/2011

OTHER PUBLICATIONS

International Search Report for issued in Application No. PCT/FR2020/050976 dated Nov. 10, 2020.
Written Opinion for PCT/FR2020/050976 dated Nov. 10, 2020.

* cited by examiner

MOBILE-COWL THRUST REVERSER COMPRISING A THRUST-REDUCTION MECHANISM THAT IS INDEPENDENT OF THE MOBILE COWL

This is the National Stage of PCT International application PCT/FR2020/050976, filed on Jun. 9, 2020 entitled "MOBILE-COWL THRUST REVERSER COMPRISING A THRUST-REDUCTION MECHANISM THAT IS INDEPENDENT OF THE MOBILE COWL", which claims the priority of French Patent Application No. 1906381 filed Jun. 14, 2019, both of which are incorporated herein by reference in their entirety.

TECHNICAL FIELD

The invention relates to the field of thrust reversers for aircraft propulsion assemblies, and more specifically to the field of cascade thrust reversers.

PRIOR ART

As a general rule, a thrust reverser can be placed in a straight jet configuration, enabling the propulsion assembly to generate a thrust, and in a reverse jet—or thrust reversal—configuration, wherein a portion of the gases circulating in the propulsion assembly is rerouted to the front of the propulsion assembly, thus generating an aircraft braking counterthrust.

A cascade thrust reverser is generally fitted in a propulsion assembly provided with a dual-flow jet engine. In such a propulsion assembly, a primary flow circulates in a primary jet traversing the jet engine gas generator and a secondary flow circulates in a secondary jet surrounding the gas generator.

The majority of cascade thrust reversers, for example that described in the document WO 2011/131874 A1, are configured in such a way that the counterthrust results from a redirection of the secondary flow.

To do this, the reverser typically comprises a sliding cowl for freeing a radial opening wherein the cascades are placed, and flaps for blocking the secondary jet. In straight jet mode, the cowl covers the cascades and the flaps are retracted such that the secondary flow contributes fully to aircraft propulsion. To reverse the jet, the sliding cowl is moved to the rear of the propulsion assembly so as to free said radial opening. The movement of the cowl is associated with a deployment of the flaps in the secondary jet. In reverse jet mode, the deployed flaps make it possible to deflect a portion of the secondary flow to the cascades which are configured to direct the portion of the flow thus deflected to the front of the propulsion assembly.

In various flight phases, it may prove to be necessary or desirable to reduce the thrust generated by the propulsion assembly. In the descent phase for example, a reduced thrust makes it possible to increase the angle of descent of an aircraft with a view to the landing thereof, which particularly makes it possible to reduce noise nuisance, relieve airspace congestion in the vicinity of airports, and optionally reduce fuel consumption.

In such a descent phase, the thrust cannot be reduced by merely reducing the gases—i.e. solely by reducing the fuel flow rate and the engine speed—as the engine is already regulated on an idle throttle stop below which it is not possible to descend while observing constraints in respect of operability (potential need for reacceleration, shut-down protection in the event of bad weather, etc.), pressurisation, or air supply to the aircraft (non-exhaustive list of constraints to observe). Therefore, it is necessary to find another means than reducing the gases and engine speed to reduce the thrust.

The document U.S. Pat. No. 10,119,495 B1 describes a method for reducing the thrust by placing the reverser in an intermediate configuration between the straight jet configuration and the reverse jet configuration. An embodiment wherein the reverser is a cascade thrust reverser is particularly described in this document (see FIGS. 6 to 8 of the above-mentioned document).

The use of a conventional thrust reverser for modulating the thrust has several drawbacks. In particular, a conventional thrust reverser placed in such an intermediate configuration tends to generate an undesirable counterthrust in certain flight phases. Furthermore, a conventional thrust reverser typically requires modifying the position of a mobile structure such as a door or a sliding cowl in order to reduce the thrust, which modifies the external aerodynamics of the nacelle and can thus disturb the air flow on the wings and produce a loss of lift, which is harmful and hazardous for the aircraft. Indeed, this can induce a loss of aircraft thrust and flight quality control.

Furthermore, in the event of failure of the system described in the document U.S. Pat. No. 10,119,495 B1, the thrust reverser could be deployed entirely (straight jet) rather than partially (intermediate configuration), resulting in the production of a counterthrust preventing aircraft path control. In this regard, the certification authorities consider the deployment of a thrust reverser in flight to be hazardous.

More generally, the partial deployment of conventional thrust reversers does not allow safe modulation of the thrust of a propulsion assembly, in particular when the propulsion assembly comprises a jet engine with a high bypass ratio, the aerodynamic effects of deploying the reverser being especially great given that the bypass ratio is high.

DESCRIPTION OF THE INVENTION

The aim of the invention is to provide a thrust reverser capable of reducing the thrust of a propulsion assembly, for example during a descent phase, while avoiding the drawbacks associated with conventional thrust reduction techniques.

To this end, the invention relates to a thrust reverser for an aircraft propulsion assembly, this reverser comprising a fixed internal structure, a mobile external structure and at least one blocking flap, this reverser being configured to be placed in:

a full thrust configuration wherein the mobile external structure is in a closing position and the at least one blocking flap is in a retracted position so as to channel a fluid flow in a conduit delimited radially inwards by the fixed internal structure and radially outwards by the mobile external structure, a thrust reversal configuration wherein the mobile external structure is in an opening position freeing a radial opening, and wherein the at least one blocking flap is in a deployed position so as to deflect a portion of said fluid flow towards said radial opening.

According to the invention, this reverser comprises an actuation mechanism configured to move the at least one blocking flap between the retracted position and a partially deployed position when the mobile external structure is in the closing position, so as to switch the reverser respectively between said full thrust configuration and a reduced thrust configuration.

The invention thus provides a thrust reverser having two distinct functions, namely a conventional thrust reversal function and a thrust reduction function, these two functions being carried out by mutually independent respective actuation mechanisms, both capable of moving said at least one blocking flap.

Unlike conventional reversers, the reverser according to the invention makes it possible to increase pressure losses and hence reduce the thrust without unlocking the mobile external structure.

This reverser particularly makes it possible to increase the angle of descent of an aircraft, which makes it possible inter alia to reduce the fuel consumption of a typical flight mission, reduce noise nuisance, and relieve airspace congestion in the vicinity of airports.

The invention also makes it possible not to degrade the manoeuvrability of the aircraft, as the external aerodynamics are not modified. The flow outside the nacelle is therefore not impacted, and in particular the flow around the wings is not disturbed. Furthermore, in the event of untimely deployment of the system inside the secondary jet, the pressure loss thus present in the jet can be compensated by an increase in the gases and speed.

According to the invention, the actuation mechanism comprises at least one tie rod and a member for driving the at least one tie rod, the driving member being movable between an idle position and an active position, the at least one tie rod being connected at a first end to the at least one blocking flap and at a second end to the driving member such that the movement of the driving member between the idle position and the active position induces a movement of the at least one blocking flap respectively between the retracted position and the partially deployed position.

Preferably, the driving member can be borne by the fixed internal structure.

According to the invention, the movement of the driving member between the idle position and the active position comprises a rotation movement of the driving member about a longitudinal axis of the reverser.

In an embodiment, the movement of the driving member between the idle position and the active position can comprise a combination of a rotation movement of the driving member about said longitudinal axis and a translation movement of this driving member along this longitudinal axis.

Preferably, this reverser can comprise a plurality of blocking flaps and a plurality of corresponding tie rods, the driving member comprising at least one ring sector to which several of said tie rods are connected.

In an embodiment, the at least one tie rod can be configured to drive the at least one blocking flap between the retracted position and the deployed position when the mobile external structure is moved between the closing position and the opening position.

The invention also relates to an aircraft propulsion assembly, this propulsion assembly comprising a reverser as defined above, and an aircraft comprising such a propulsion assembly.

The invention also relates to a method for deploying at least one blocking flap of a reverser as defined above, this method simultaneously comprising a step for holding said mobile external structure in said closing position and a step for moving the at least one blocking flap, using said actuation mechanism, between said retracted position and said partially deployed position.

Further advantages and features of the invention will emerge on reading the following non-limiting detailed description.

BRIEF DESCRIPTION OF THE DRAWINGS

The following detailed description refers to the appended drawings wherein.

DETAILED DESCRIPTION OF EMBODIMENTS

Figure 1:
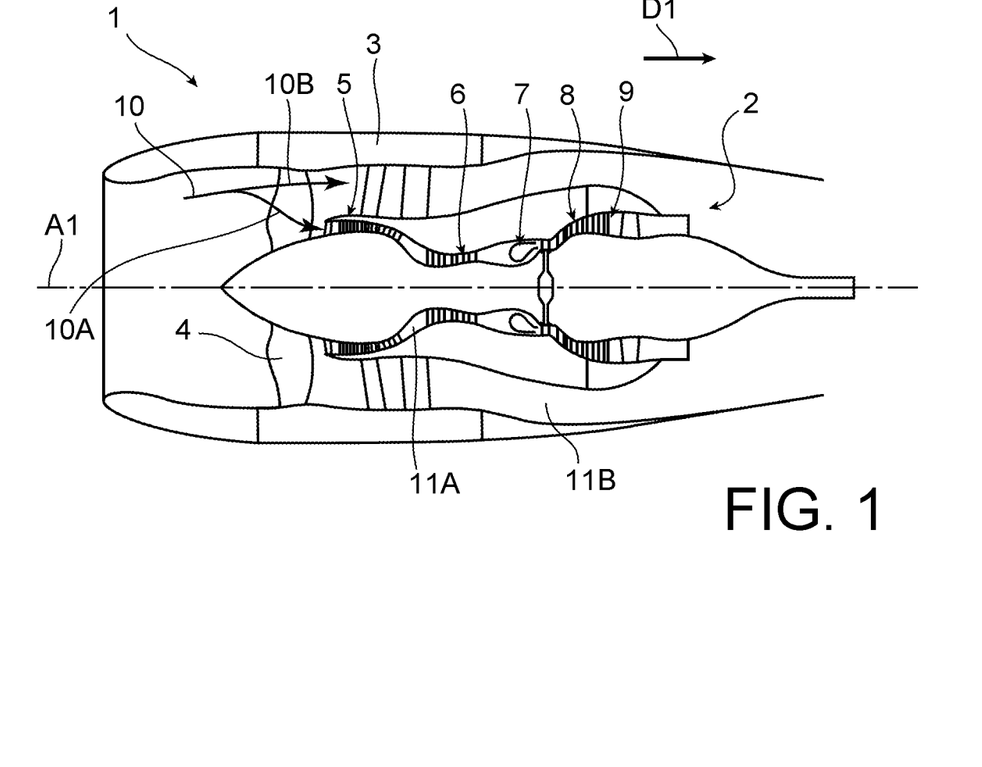
FIG. 1 is a schematic axial sectional view of an aircraft propulsion assembly comprising a dual-body and dual-flow jet engine.

In FIG. 1, an aircraft propulsion assembly 1 comprising a turbine engine 2 faired by a nacelle 3 is represented. In this example, the turbine engine 2 is a dual-body and dual-flow jet engine.

Hereinafter, the terms "upstream", "downstream", "front" and "rear" are defined with respect to a direction D1 of gas flow through the propulsion assembly 1 when the latter is propelled.

The jet engine 2 has a longitudinal central axis A1 about which extend the various components thereof, in this instance, from upstream to downstream of the jet engine 2, a fan 4, a low-pressure compressor 5, a high-pressure compressor 6, a combustion chamber 7, a high-pressure turbine 8 and a low-pressure turbine 9. The compressors 5 and 6, the combustion chamber 7 and the turbines 8 and 9 form a gas generator.

Conventionally, during the operation of such a jet engine 2, an air flow 10 enters the propulsion assembly 1 through an air inlet upstream from the nacelle 3, traverses the fan 4 and then is split into a central primary flow 10A and a secondary flow 10B. The primary flow 10A flows in a primary gas circulation jet 11A traversing the gas generator. The secondary flow 10B flows for its part in a secondary jet 11B surrounding the gas generator and delimited radially outwards by the nacelle 3.

Figure 2:
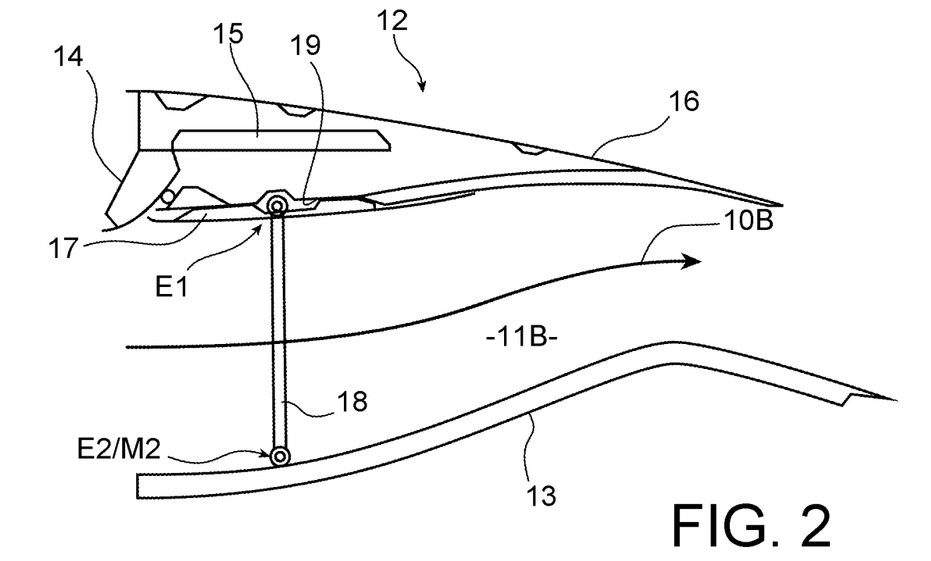
FIG. 2 is a schematic axial sectional view of a thrust reverser according to the invention, in a full thrust configuration.
Figure 3:
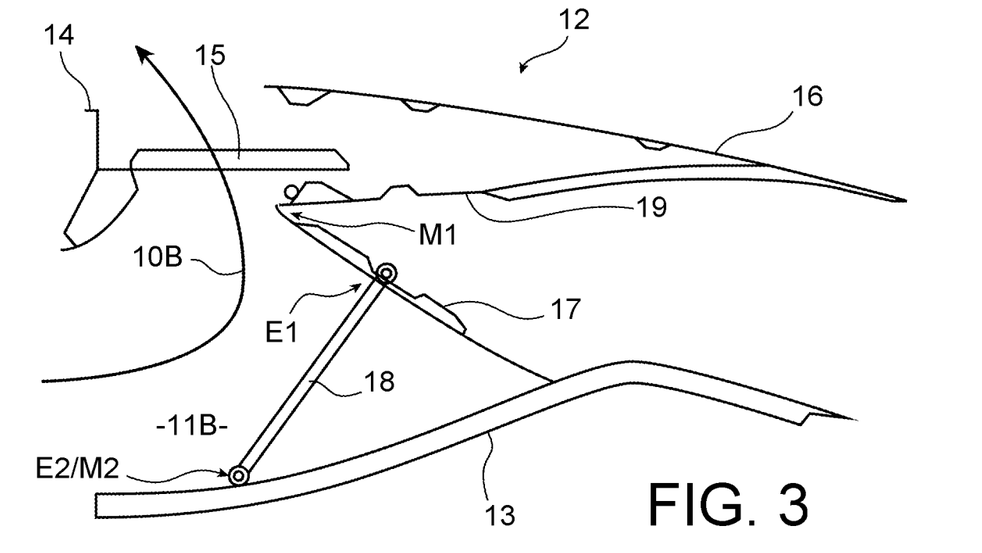
FIG. 3 is a schematic axial sectional view of the reverser in FIG. 2, in a thrust reversal configuration.
Figure 4:
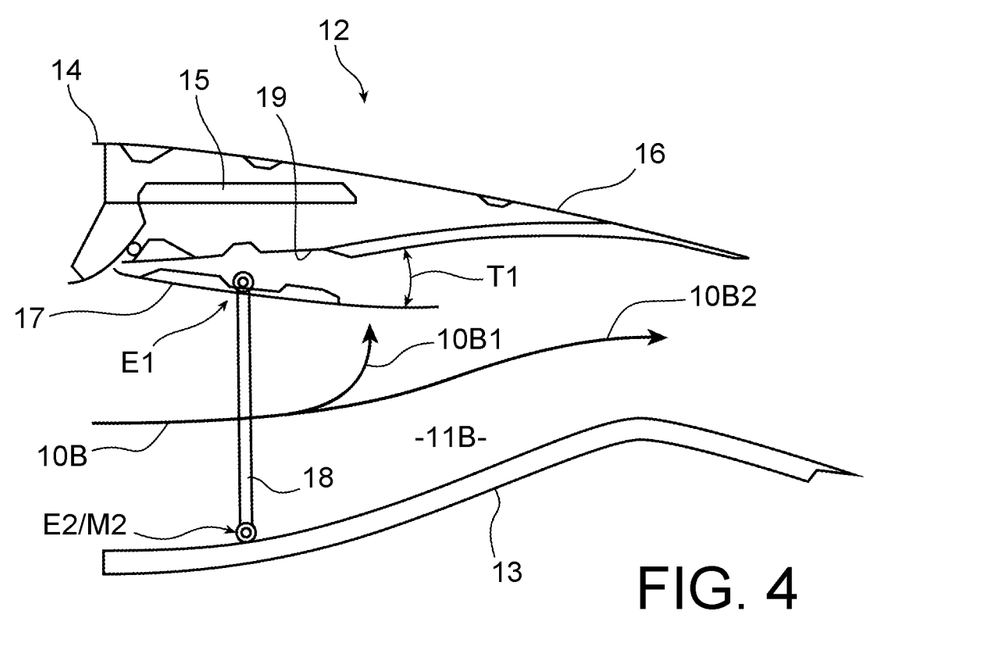
FIG. 4 is a schematic axial sectional view of the reverser in FIG. 2, in a reduced thrust configuration.

The invention relates to a cascade thrust reverser 12 as illustrated in FIGS. 2 to 4 for reversing or modulating the thrust generated by such a propulsion assembly 1.

This reverser 12 comprises on one hand fixed elements with respect to a stator of the jet engine 2, including a fixed internal structure 13, a front frame 14 and cascades 15 borne by the front frame 14.

This reverser 12 furthermore comprises mobile elements with respect to the fixed elements cited above, including a mobile external structure 16 forming a mobile cowl, blocking flaps 17 and tie rods 18. These mobile elements make it possible to modify the configuration of the reverser 12.

FIG. 2 shows the reverser 12 in a full thrust, or straight jet, configuration. In this configuration, the mobile cowl 16 is in a closing position wherein it bears axially against the front frame 14 while covering the cascades 15.

In straight jet mode, the mobile cowl 16 and the fixed internal structure 13 delimit radially therebetween a downstream portion of the secondary jet 11B.

The blocking flaps 17 are in a retracted position wherein they are housed in a cavity 19 of the mobile cowl 16 so as not to block the secondary jet 11B.

Thus, in direct jet mode, the reverser 12 makes it possible to channel the secondary flow 10B to the rear of the propulsion assembly 1 such that this secondary jet 10B fully contributes to the propulsion of the aircraft.

FIG. 3 shows the reverser 12 in a thrust reversal, or reverse jet, configuration. In this configuration, the mobile cowl 16 is in an opening position wherein it frees a radial opening consisting in this example of openings of the cascades 15. Indeed, the axial translation of the mobile cowl 16, to the rear of the propulsion assembly 1 with respect to the front frame 14, uncovers the cascades 15 which are rigidly connected to the front frame 14. Sliding the mobile cowl 16 from the closing position (FIG. 2) to the opening position (FIG. 3) induces a deployment of the blocking flaps 17 in the secondary jet 11B. For this purpose, the blocking flaps 17 are hinged to the mobile cowl 16 at a hinge point M1 and each of the tie rods 18 is connected at a first end E1 to a respective blocking flap 17 and at a second end E2 to the fixed internal structure 13.

In reverse jet mode, the blocking flaps 17 are thus in a deployed position wherein the latter are configured to deflect towards the cascades 15 a portion representing in this example substantially the entire secondary flow 10B (see FIG. 3).

In a manner known per se, the cascades 15 comprise turbine blades for routing the secondary flow 10B traversing these cascades 15 to the front of the propulsion assembly 1. In this thrust reversal configuration, the secondary flow 10B thus generates an aircraft braking counterthrust.

The above description relates to the full thrust and thrust reversal configurations. Switching from the first to the second and from the second to the first of these configurations is performed by a first actuation mechanism (not shown) configured to move the mobile cowl 16 axially from the front to the rear or from the rear to the front respectively, this first actuation mechanism typically comprising a plurality of cylinders. In each of these directions of translation of the mobile cowl 16, the flaps 17 change position under the action of the tie rods 18 which, during such a translation, are hinged by the second end E2 thereof at a fixed hinge point M2 with respect to the fixed internal structure 13.

The invention relates more specifically to a second actuation mechanism independent from said first actuation mechanism and suitable for moving the blocking flaps 17 when the mobile cowl 16 is in the closing position, in order to reduce the thrust without generating counterthrust.

FIG. 4 shows the reverser 12 in a reduced thrust configuration wherein the mobile cowl 16 is in the closing position and wherein the blocking flaps 17 are in a partially deployed position. A portion 10B1 of the secondary flow 10B is dissipated due to the interaction of this flow with the flaps 17 which partially block the secondary jet 11B, such that only a restricted portion 10B2 of the secondary flow 10B contributes per se to aircraft propulsion.

In this example, each partially deployed flap 17 is oriented according to an angle T1 of about pi/6 radians with respect to the position of this flap 17 in the retracted position (see FIG. 4).

FIGS. 5 to 8 show examples of actuation mechanisms according to the invention.

In each of these examples, the partial deployment of the flaps 17 results from the modification of the relative position of the second end E2 of the tie rods 18 with respect to the fixed internal structure 13.

To this end, the actuation mechanism comprises a driving member 20 borne by the fixed internal structure 13 of the reverser 12 and to which the tie rods 18 are connected by the second end E2 thereof. In other words, the tie rods 18 are in this example connected by the second end E2 thereof to the fixed internal structure 13 via the driving member 20. The driving member 20 is movable between an idle position and an active position.

Figure 5:
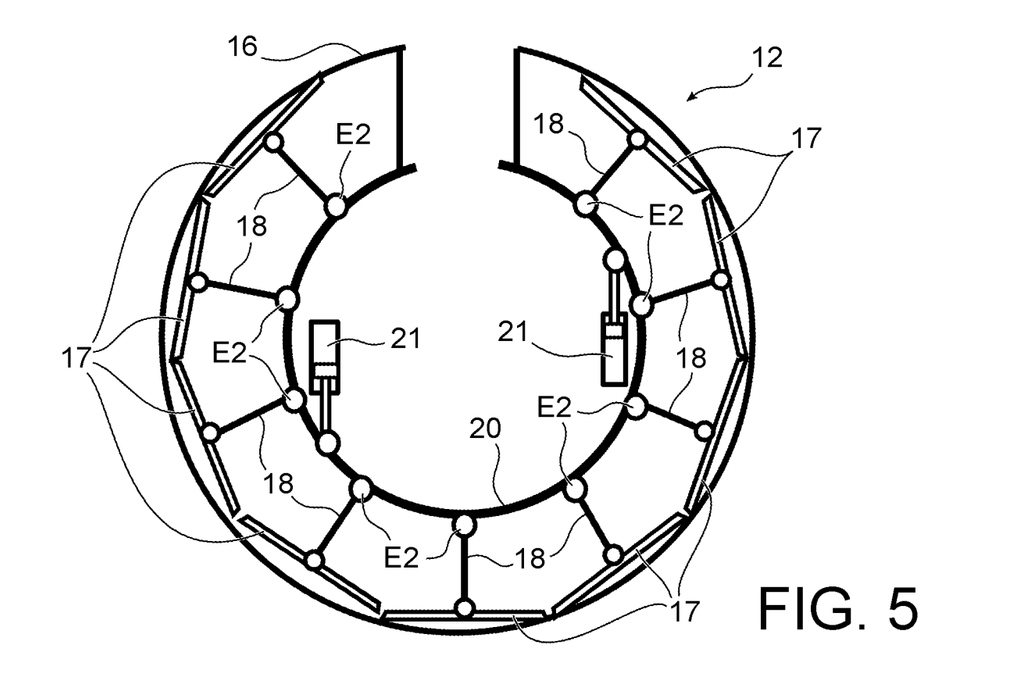
FIG. 5 is a schematic transverse sectional view of a thrust reverser according to the invention, comprising a rotation actuation mechanism according to a first embodiment, in a full thrust configuration.

When the driving member 20 is in the idle position, the mobile cowl 16 can be moved between the closing position and the opening position as described above with reference to FIGS. 2 and 3. Thus, when the driving member 20 is in the idle position and the mobile cowl 16 is in the closing position, the reverser 12 is in the full thrust configuration. When the driving member 20 is in the idle position and the mobile cowl 16 is in the opening position, the reverser 12 is in the thrust reversal configuration. FIG. 5 shows the reverser 12 in the full thrust configuration, the driving member 20 being in the idle position, the mobile cowl 16 in the closing position and the flaps 17 in the retracted position.

Figure 6:
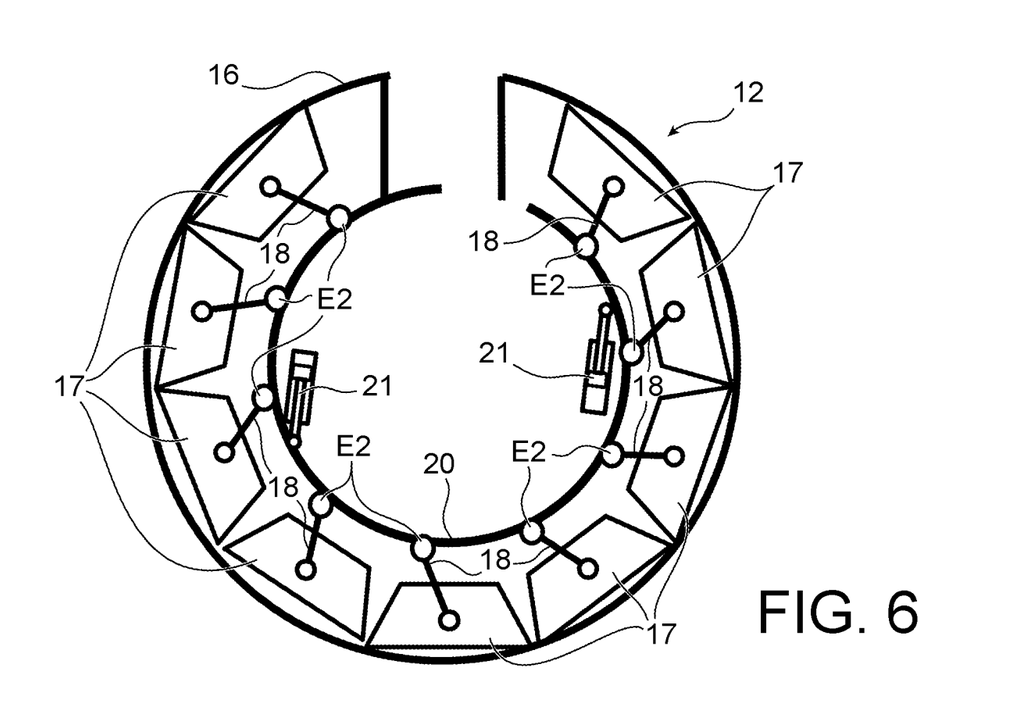
FIG. 6 is a schematic transverse sectional view of the reverser in FIG. 5, in a reduced thrust configuration.

In this example, the movement of the driving member 20 between the idle position and the active position is only possible when the mobile cowl 16 is held in the closing position. When the driving member 20 is in the active position, the reverser 12 is in the reduced thrust configuration. FIG. 6 shows the reverser 12 in the reduced thrust configuration, the driving member 20 being in the active position, the mobile cowl 16 in the closing position and the flaps 17 in the partially deployed position.

FIGS. 5 and 6 show a reverser 12 having an architecture commonly known as "O-Duct", with a mobile cowl 16 made of one piece.

In this embodiment, the driving member 20 forms a ring sector to which all the tie rods 18 are connected by the second end E2 thereof.

In this embodiment, the movement of the driving member 20 between the idle position (FIG. 5) and the active position (FIG. 6) comprises a rotation movement of this driving member 20 about a longitudinal axis of the reverser 12 which coincides with the axis A1 of the propulsion assembly 1.

The rotation of the driving member 20 about the longitudinal axis of the reverser 12 induces a corresponding movement of the second end E2 of the tie rods 18 such that the latter induce a pivoting of the flaps 17 between the retracted position thereof and the partially deployed position thereof.

Figure 7:
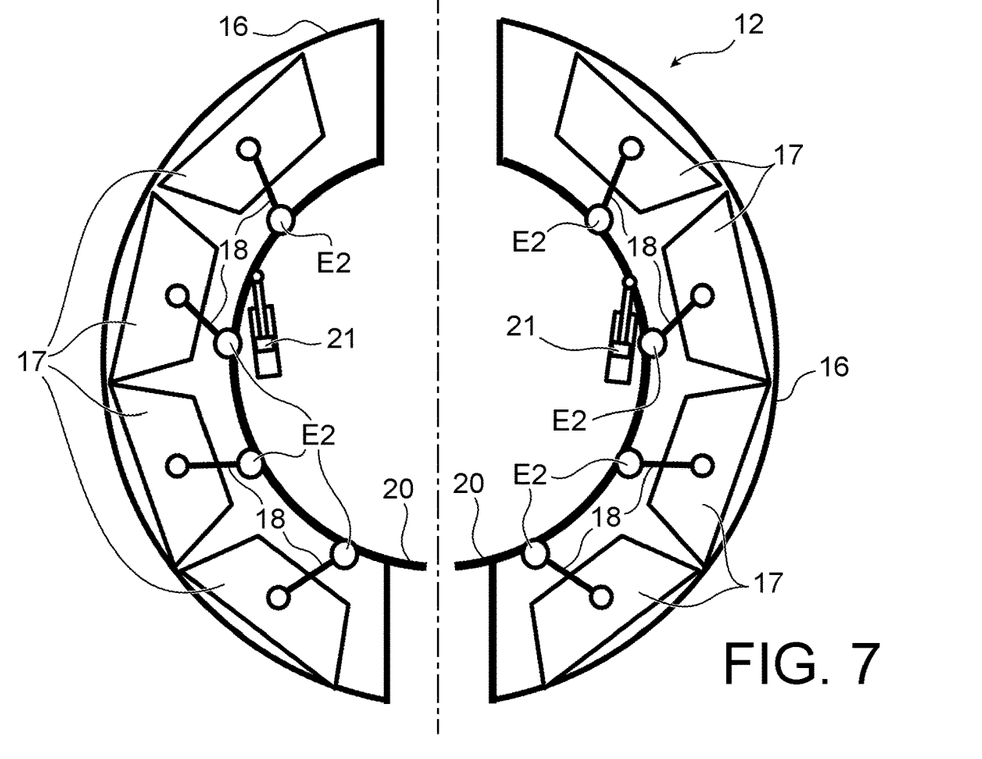
FIG. 7 is a schematic transverse sectional view of a thrust reverser according to the invention, comprising a rotation actuation mechanism according to a second embodiment, in a reduced thrust configuration.

FIG. 7 shows a reverser 12 having an architecture commonly known as "D-Duct", with a mobile cowl 16 embodied in the form of two half-cowls, the reverser 12 being in the reduced thrust configuration.

The embodiment in FIG. 7 also differs from that in FIGS. 5 and 6 in that the driving member 20 forms two ring sectors. The tie rods 18 of flaps 17 connected to one of the half-cowls are connected by the second end E2 thereof to one of these ring sectors, the tie rods 18 of flaps 17 connected to the other half-cowl being connected by the second end E2 thereof to the other ring sector.

In the embodiments in FIGS. 5 to 7, the movement of the driving member 20 between the idle position and the active position is performed by an actuator comprising cylinders 21 in these examples.

Figure 8:
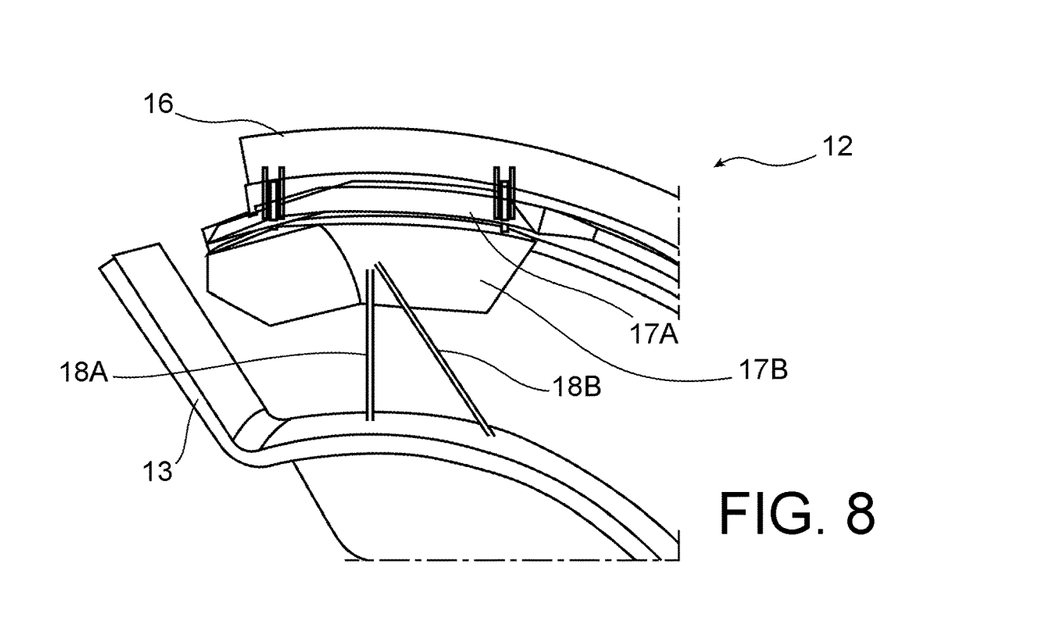
FIG. 8 is a schematic perspective view of a thrust reverser according to the invention, comprising a rotation actuation mechanism and being represented simultaneously in a full thrust configuration and in a reduced thrust configuration.

FIG. 8 shows a flap and a corresponding tie rod of a reverser 12 similar to that of the embodiments in FIGS. 5 to 7 simultaneously in the full thrust and reduced thrust configuration: the flap is designated by the reference 17A in the retracted position and by the reference 17B in the partially deployed position, the tie rod is designated by the reference 18A in the full thrust configuration and by the reference 18B in the reduced thrust configuration.

Figure 9:
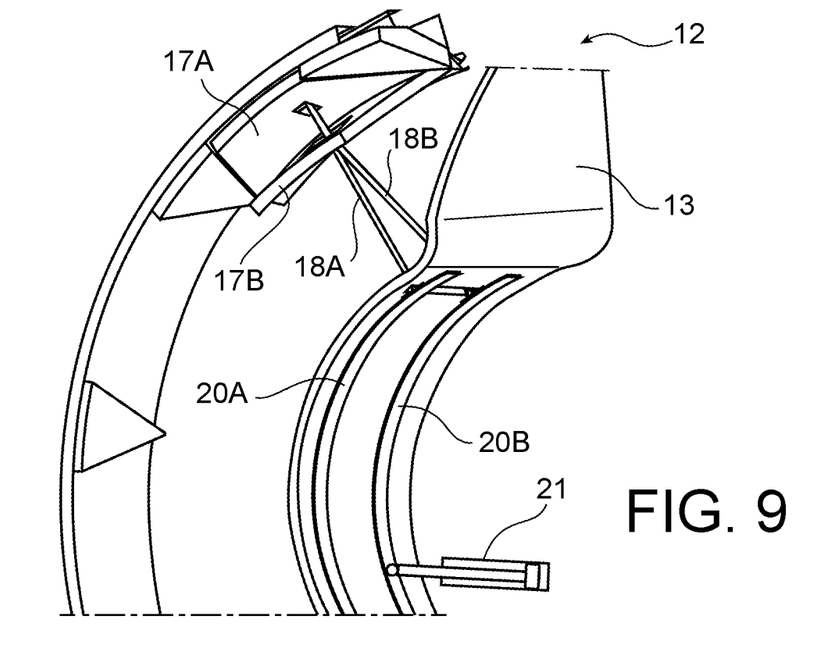
FIG. 9 is a schematic perspective view of a thrust reverser, comprising a translation actuation mechanism and being represented simultaneously in a full thrust configuration and in a reduced thrust configuration.
Figure 10:
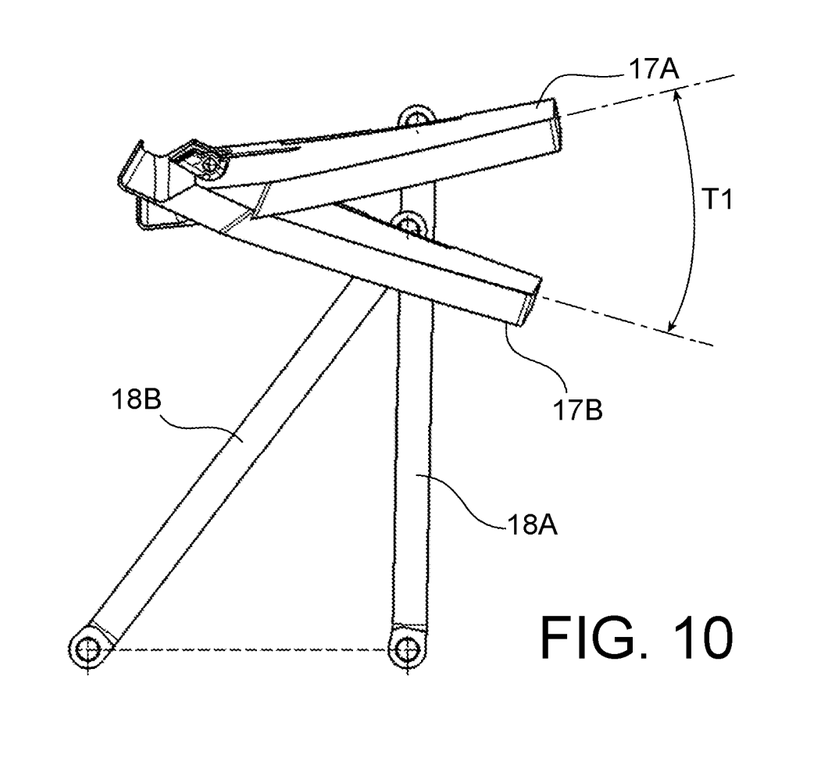
FIG. 10 is a schematic axial sectional view of a blocking flap and a tie rod of the reverser in FIG. 9, represented simultaneously in the full thrust configuration and in the reduced thrust configuration.

FIGS. 9 and 10 show a further embodiment not covered by the claims and which differ from those described in that the movement of the driving member 20 between the idle position and the active position comprises a translation movement of this driving member 20 along said longitudinal axis of the reverser 12.

Similarly to FIG. 8, the reverser 12 of FIGS. 9 and 10 is shown simultaneously in the full thrust configuration and in the reduced thrust configuration, the driving member being designated by the reference 20A in the idle position and by the reference 20B in the active position.

What is claimed is:

1. A thrust reverser for an aircraft propulsion assembly, the thrust reverser comprising:
    a fixed internal structure, a mobile external structure and at least one blocking flap, wherein the thrust reverser is configured to be placed in:
        a full thrust configuration wherein the mobile external structure is in a closing position and the at least one blocking flap is in a retracted position so as to channel a fluid flow in a conduit delimited radially inwards by the fixed internal structure and radially outwards by the mobile external structure, p2 a thrust reversal configuration wherein the mobile external structure is in an opening position freeing a radial opening, and wherein the at least one blocking flap is in a deployed position so as to deflect a portion of said fluid flow towards said radial opening;
        a reduced thrust configuration wherein the mobile external structure is in the closing position and the at least one blocking flap is in a partially deployed position; and
    an actuation mechanism configured to move the at least one blocking flap between the retracted position and the partially deployed position while the mobile external structure is in the closing position, so as to switch the thrust reverser respectively between said full thrust configuration and said reduced thrust configuration, the actuation mechanism comprising at least one tie rod and a driving member of the at least one tie rod, the driving member being movable between an idle position and an active position, the at least one tie rod being connected at a first end to the at least one blocking flap and at a second end to the driving member such that the movement of the driving member between the idle position and the active position induces a movement of the at least one blocking flap respectively between the retracted position and the partially deployed position, the movement of the driving member between the idle position and the active position comprising a rotation movement of the driving member about a longitudinal axis of the thrust reverser.

2. The thrust reverser according to claim 1, wherein the driving member is borne by the fixed internal structure.

3. The thrust reverser according to claim 1, further comprising a plurality of blocking flaps and a plurality of corresponding tie rods, the driving member comprising at least one ring sector to which several of said tie rods are connected.

4. The thrust reverser according to claim 1, wherein the at least one tie rod can be configured to drive the at least one blocking flap between the retracted position and the deployed position when the mobile external structure is moved between the closing position and the opening position.

5. An aircraft propulsion assembly comprising the thrust reverser according to claim 1.

6. An aircraft comprising the aircraft propulsion assembly according to claim 5.

7. A method for deploying the at least one blocking flap of the thrust reverser according to claim 1, the method comprising:
    a step of holding said mobile external structure in said closing position; and
    simultaneously with the step of holding a step of moving the at least one blocking flap, using said actuation mechanism, between said retracted position and said partially deployed position.

* * * * *